United States Patent [19]
Chao et al.

[11] Patent Number: 5,790,539
[45] Date of Patent: Aug. 4, 1998

[54] ASIC CHIP FOR IMPLEMENTING A SCALEABLE MULTICAST ATM SWITCH

[76] Inventors: Hung-Hsiang Jonathan Chao, 13 Yellow Brook Rd., Holmdel, N.J. 07733; Necdet Uzun, 2255 Benson Ave., 3F, Brooklyn, N.Y. 11214

[21] Appl. No.: 591,926

[22] Filed: Jan. 29, 1996

[51] Int. Cl.$^6$ .................................................. H04L 12/56
[52] U.S. Cl. .................................... 370/390; 370/398
[58] Field of Search ..................................... 370/395, 398, 370/399, 422, 427, 360, 423, 390; 340/825.8, 825.89

[56] References Cited

U.S. PATENT DOCUMENTS

| | | | |
|---|---|---|---|
| 5,016,245 | 5/1991 | Lobjinski et al. | 370/398 |
| 5,499,239 | 3/1996 | Munter | 370/423 |
| 5,583,861 | 12/1996 | Holden | 370/395 |
| 5,602,844 | 2/1997 | Lyles | 370/395 |

*Primary Examiner*—Hassan Kizou
*Attorney, Agent, or Firm*—Michaelson & Wallace; Peter L. Michaelson; John C. Pokotylo

[57] ABSTRACT

An application specific integrated circuit (or "ASIC") chip for building a scaleable, multicast, asynchronous transfer mode (or "ATM") switch having on the order of 100 to a few thousand input and output ports. The ATM switch has a regular structure and may be easily expanded. Furthermore, the ATM switch permits synchronization for data and clock signals to be relaxed. Moreover, the switch system may be built using economic CMOS technology. The switch fabric of the ASIC chip can handle high line rates, supports multicasing functionality, and permits output groups to be flexibly altered. The ASIC chips may be arranged in an array thereby permitted the switch size to be scaled.

25 Claims, 16 Drawing Sheets

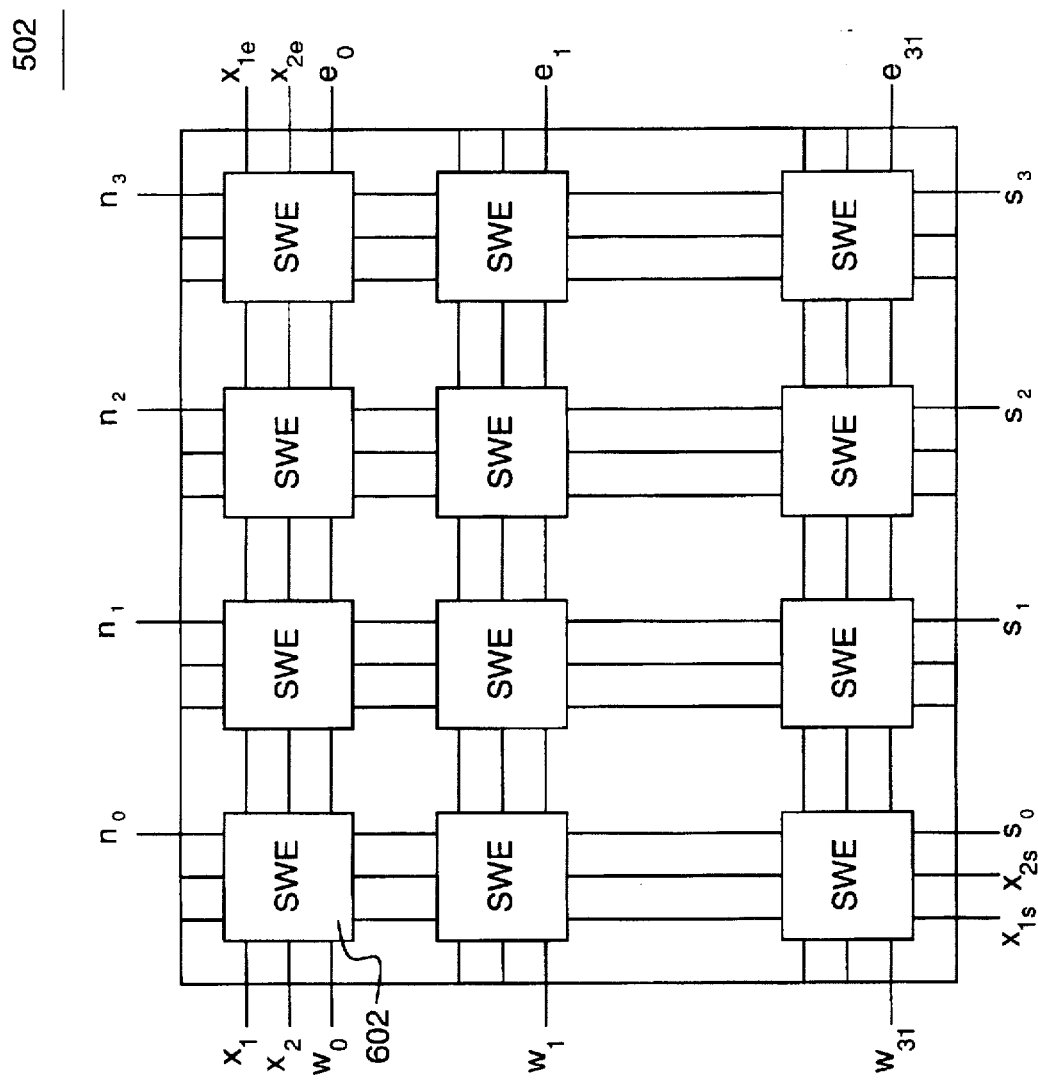
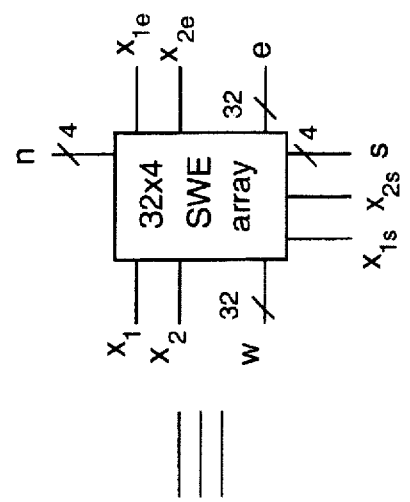
Figure 6a
Figure 6b

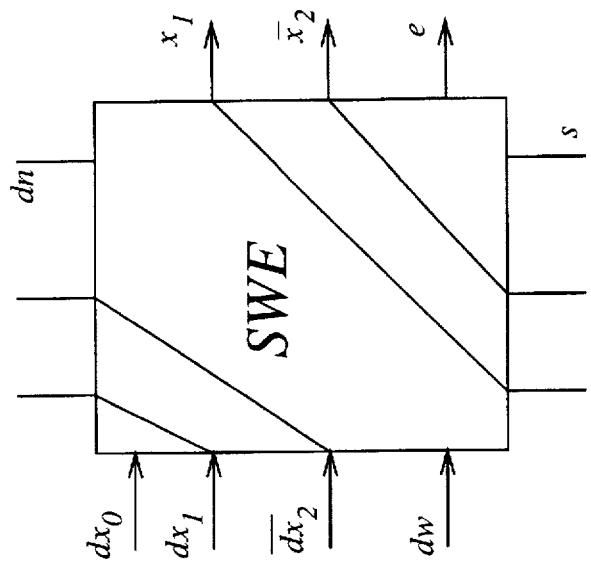
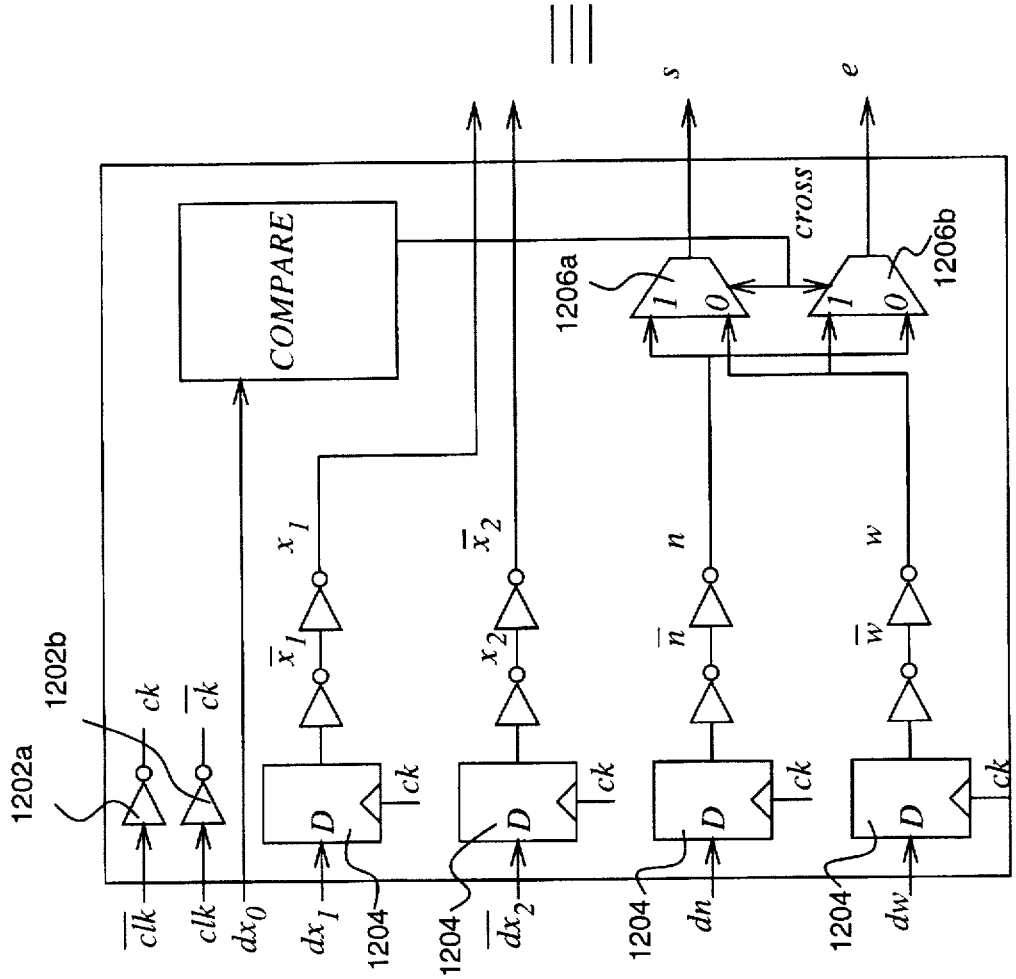
Figure 12(b)
Figure 12(a)

ASIC CHIP FOR IMPLEMENTING A SCALEABLE MULTICAST ATM SWITCH

BACKGROUND OF THE INVENTION

1. Field of the Invention

Our invention concerns an application specific integrated circuit (or "ASIC") chip for building a scaleable multicast asynchronous transfer mode (or "ATM") switch having on the order of 100 to a few thousand input and output ports. The ATM switch, the architecture of which is described in U.S. patent application Ser. No. 08/511,811 (filed on Aug. 7, 1995 and entitled "A Scaleable Multicast ATM Switch") and Provisional Application Ser. No. 60/005,858 (filed on Oct. 26, 1995 and entitled "Improved Large Scale ATM Switch with Dual Feedback and Barrel Shifter")(each of which are expressly incorporated herein by reference), has a regular structure and may be easily expanded. Furthermore, the ATM switch permits synchronization for data and clock signals to be relaxed. Moreover, the switch system may be built using economic CMOS technology.

2. Related Art

Packet switched communications presently appear to be the preferred mode of communication over a B-ISDN (or "Broadband-Integrated Services Digital Network") service. Packet switching includes normal packet switching (e.g., X25) and fast packet switching (e.g., Asynchronous Transfer Mode or "ATM"). Normal packet switching assumes certain errors at each data link are probable enough to require complex protocols so that such errors can be controlled at each link. Link errors were a valid assumption and concern at one time. However, today data links are very reliable such that the probability of errors being introduced by data links are no longer of any concern. Therefore, ATM fast packet switching does not correct errors or control flow within the network (i.e., on a link-by-link basis). ATM operates in a connection-oriented mode such that when a connection is requested, a line terminal first checks whether sufficient resources (i.e., whether sufficient bandwidth and buffer area) are available. When the transfer of information is complete, the resources are "released" (i.e., are made available) by the line terminal.

An ATM packet includes a header field (generally five (5) bytes) and a payload (or information) field (generally 48 bytes). The main function of the header is to identify a virtual connection to guarantee that the ATM packet is properly routed through the network. Switching and/or multiplexing is first performed on virtual channels and then on virtual paths. The relatively short length of the payload or information field reduces the assembly delay for some low bit-rate traffic, e.g., voice.

Fast packet switching, such as ATM switching, has three main advantages. First ATM switching is flexible and is therefore safe for future transfer rates. Second, no resources are specialized and consequently, all resources may be optimally shared. Finally, ATM switches permit economies of scale for such a universal network.

ATM packets (cells) are routed through a network by means of a series of ATM switches. An ATM switch must perform three basic functions for point-to-point switching; namely, (i) routing the ATM cell, (ii) updating the virtual channel identifier (VCI) and virtual path identifier (VPI) in the ATM cell header, and (iii) resolving output port contention. Further, for most applications, the ATM switch must also facilitate multicasting functions. The first two functions, namely routing and updating, are performed by a translation table belonging to the ATM switch. The translation table converts an incoming link (input port) and VCI/VPI to an outgoing link (output port) and VCI/VPI. An arbiter is used to resolve output port contention among two or more ATM cells destined for the same output port. The arbiter chooses an ATM cell which "wins" contention (i.e., which is applied to the output port). Other ATM cells contending for the output port "lose" contention (i.e., they must wait before being applied to the output port). The multicasting feature allows incoming cells to be sent to multiple outputs simultaneously or in multiple cycles (i.e., call splitting). The ability to multicast is required for ATM switches used in applications such as video-on-demand, video conferencing, and data communication.

U.S. patent application Ser. No. 08/511,811 and Provisional Application Ser. No. 60/005,858 (each of which are expressly incorporated herein by reference), disclose preferable large scale ATM switch architectures. These ATM switch architectures have a regular structure and may be easily expanded. Furthermore, these ATM switch architectures permit relaxed data and clock signal synchronization. Moreover, the switch system may be built using economic CMOS technology.

Although the architecture of the ATM switch is described, in detail, in U.S. patent application Ser. No. 08/511,811, which has been incorporated herein by reference, the architecture is briefly described here for the convenience of the reader.

There are several approaches to building a large-scale ATM switch. Among them, output buffering (including shared-memory output buffering) has been proven to provide the best delay and throughput performance. However, as the switch reaches a certain size, the memory speed of the output buffer may become a bottleneck, or the technology used to implement the output buffer memory may become too costly. For instance, in a shared-memory switch with 256 input and output ports operating at a 155 Mbit/s per input rate, the memory cycle time must be less than 5.5 ns (2.8 μs/(256×2)). One way to eliminate the speed constraint of the output buffer memory is to input buffer some cells destined for the same output port. The well-known head-of-line (HOL) blocking drawback associated with input buffering can be improved by speeding up the bandwidth of the internal links (e.g., 3 to 4 times the bandwidth of the input line) or increasing the number of routing links to each output port. For instance, if the speed-up factor or the number of routing links per output port is chosen to be 4, the throughput of the switch will be increased from 58% (due to the HOL blocking) to 99%.

Since multiple cells can arrive in one time slot ("one time slot" is the time to transmit one ATM cell at the prevailing line rate) at each output port while only one cell can be transmitted to the network, an output buffer is required. The input-and-output buffering approach provides satisfactory performance while eliminating the memory speed limitation discussed above. The paper entitled J. Chao et al., "Abacus Switch: A New Scaleable Multicast ATM Switch," Proc. SPIE '95, Philadelphia (October 1995) (hereinafter referred to as "the Chao article") has reported that for a satisfactory cell loss probability, the output buffer should be much larger than the input buffer, e.g., a few thousand versus a few tens of cells. Other examples of input-and-output buffered ATM switches are discussed in K. Genda et al., "A 160 Gb/s ATM Switching System using an Internal Speed-up Crossbar Switch," GLOBECOM '94, pp. 123–133 (November 1994) and E. Munter, "A High Capacity ATM Switch based on Advanced Electronic and Optical Technologies," Proc. ISS '95, Berlin, pp. 389–393 (April 1995).

Thus, the challenge of implementing input-and-output buffered switches had been to resolve output port contention among input cells destined for the same output port (or the same output module for a two-stage architecture) to minimize both cell loss probability and output buffer size. The contention resolution function is usually handled by an arbiter. Now the bottleneck caused by the memory speed of the output buffers is shifted to the arbiter. However, by intelligently applying parallel processing and pipeline techniques to implement the arbiter, U.S. patent application Ser. No. 08/511,811 provides a feasible large-scale switch architecture.

The switch architecture disclosed in U.S. patent application Ser. No. 08/511,811 employs an input and output buffering scheme. Cell replication, cell routing, and output contention resolution are all performed distributedly so that the switch can be scaled up to a large size. The switch architecture adopts a novel algorithm to resolve the contention of both multicast and unicast cells destined for the same output port (or output module). Furthermore, the switch architecture (1) shares input buffers, (2) provides fairness among the input ports, and (3) supports multicast call splitting. The call splitting function allows a multicast cell to be delivered to subsets of destined output ports in multiple cycles, thereby increasing the throughput of the switch.

A switch with 64 inputs and 64 outputs, is shown in FIG. 1. The large-scale architecture with thousands of input and output ports is described in U.S. patent application Ser. No. 08/511,811. The 64×64 switch includes input port controllers (IPCs) 102, a multicast grouping network (MGN) 104, and output buffers 106.

The input port controllers (IPCs) 102 terminate input signals from a network, look up necessary information in a translation table, and attach routing information to the front of each cell before it is routed in the multicast grouping network (MGN) 104. The input port controllers (IPCs) 102 also facilitate contention resolution of input cells destined for the same output port and buffer cells provided to the multicast grouping network (MGN) 104 such that cells losing contention are not lost. The routing information attached to each of the cells by the input port controllers (IPCs) 102 includes address and priority fields. The address can be the physical address of an output port for a unicast case, or a multicast pattern (MP) for a multicast case. A multicast pattern (MP) is a bit map of all output ports, each bit indicating if the cell is to be sent to the associated output port. For a 64×64 switch, the multicast pattern (MP) is a string of 64 bits.

The multicast grouping network (MGN) 104 includes 64 routing modules (RMs) 108. Each routing module (RM) 108 contains a two-dimensional array of switch elements (SWEs) 602 arranged in a cross-bar structure, as shown in FIG. 2. As further shown in FIG. 2, each routing module (RM) 108 has 64 horizontal input lines and 4 vertical routing links. Up to four (4) cells from among the 64 inputs can arrive at an output port simultaneously, and can be arbitrarily routed to any one of the four (4) routing links.

Cell replication and routing functions are performed distributedly, resulting in a scaleable architecture. Cell replication is achieved by broadcasting incoming cells to all routing modules (RMs) 108, which then route cells (winning contention) to their output links (See e.g., FIG. 1). Each of the switch elements (SWE) 602 routes cells from its west and north inputs to its east and south outputs, respectively, when it is in a "cross" state or to south and east outputs, respectively, when it is in a "toggle" state. The switch element (SWE) 602 determines its state by comparing address bits and priority bits of the cells received at its west and north inputs.

U.S. Pat. No. 5,179,552 (hereinafter referred to as "the '552 patent") discloses a crosspoint matrix switching element for use in a packet switch. Similar to the switching element (SWE) 602 of our present invention, the switching element disclosed in the '552 patent has a "cross" state and a "toggle" state. Unfortunately, the switching elements disclosed in the '552 patent have three main disadvantages; namely, they cannot perform multicasting functions, the output group size is fixed, and their speed is limited. Each of these disadvantages is briefly discussed below.

First, the structure of both the chip and the switching element disclosed in the '552 patent cannot perform multicasting which, as mentioned above, is a necessary function in most ATM switching applications. Specifically, as shown in FIG. 13 of the '552 patent, the west input of the switch elements are provided with the east output of an adjacent switching element. Moreover, the switch elements disclosed in the '552 patent compare the entire address fields of the north and west input cells.

Secondly, the switching elements disclosed in the '552 patent are arranged into an arrays with an output group size equal to the number of output signals which cannot be flexibly changed. To configure one switch into different sizes (with scaling capability), the output group size of the switch chip must be flexible.

Thirdly, the speed of the switch elements disclosed in the '552 patent are limited. Specifically, the switch elements of the '552 patent use half clock cycles for address and priority comparisons. Otherwise, the address and priority bits of the north and west input cells might overlap due to a slight out-of-phase condition of these signals.

Thus, a switching element which (i) permits multicasting, (ii) is configurable into output groups of different sizes (e.g., 4, 8, 16 or 32), and (iii) is faster than the known switch elements of the '552 patent is needed.

Each routing module (RM) 108, by its inherent operation, simultaneously (1) filters cell addresses, (2) concentrates cells, and (3) sorts the priority of the cells. Cells having addresses which match the output address compete for a limited number of output links in the routing module (RM) 108. For instance, up to 64 input cells may compete for the four (4) output links of a particular routing module (RM) 108). During the competition, higher priority cells are chosen over lower priority cells. Since the input port controllers (IPCs) 102 buffer each cell, cells that lose contention will retry during subsequent cell time slots until they have been successfully transmitted to all desired output port(s).

The multicast contention resolution algorithm disclosed in U.S. patent application Ser. No. 08/511,811 achieves fairness among input ports during cell contention by dynamically assigning a priority level to the head-of-line (HOL) cell of each input port. The priority level, called local priority (LP), is unique for each HOL cell and changes from one cell time slot to the next.

When the cells are routed through the routing module (RM) 108, they will have been sorted at the output links of the routing module (RM) 108 according to their priority levels, from left to right in a descending order (see FIG. 2). To reiterate, this sorting occurs automatically, by way of the inherent operation of the routing module (RM) 108. The cell appearing at the rightmost output link of each routing module (RM) 108 has the lowest priority level of the cells that have been routed through (i.e., won contention in) that particular routing module (RM) 108. This lowest priority information is fedback to all input port controllers (IPCs) 102. Each input port controller (IPC) 102 will then compare the local priority of its HOL cell (which is buffered) with the feedback priority (FP) of the output port(s) for which the HOL cell is destined to determine if its HOL cell has been routed through the routing module (RM) 108.

If the feedback priority (FP) is lower than or equal to the local priority (LP), the input port controller (IPC) 102 is assured that its HOL cell has reached one of the output links of the routing module (RM) 108. Otherwise, the HOL cell of the input port controller (IPC) 102 must have been discarded in the routing module (RM) 108 due to loss of contention. If so, the HOL cell will be retransmitted in the next cell time slot. Since whether or not the HOL cell will win the contention can not be known with certainty when the cell is sent to the routing module (RM) 108, the cell is temporarily stored in a one-cell buffer for possible retry in the future.

Although one skilled in the art may make and use an ATM switch having the architecture disclosed in the above referenced applications, an optimal design of the physical switch, and in particular, the multicast grouping network (MGN) 104 of the physical switch, is needed. The physical switch must filter cell addresses, concentrate cells, and arbitrate output port contention among cells. The physical switch should also be flexible to permit switch architectures of various scales (e.g., 64, 256, or 1024 input and output ports, and up) to be easily implemented from a single chip type. The physical structure of the switch should be capable of handling relatively high line rates. The physical structure of the switch should permit multicasting functionality. Lastly, the physical structure of the switch should preferably be implemented on a single type of chip.

SUMMARY OF THE INVENTION

Our invention provides an ASIC chip which achieves the aforementioned needs. Our ASIC chip, also known as an ATM Routing and Concentration (or "ARC") chip, contains a two-dimensional array of switch elements (SWEs) arranged in a cross-bar structure. Our ARC chip may be flexibly configured into different group sizes to accommodate different ATM switch sizes. A prototype of our ARC chip, with an array of 32×32 switch elements (SWEs), was fabricated using CMOS 0.8 μm technology. A test of this prototype indicated proper operation at a 240 MHz clock rate. Although the ARC chip was designed to handle the line rate at 155 Mbit/s, by using a bit-sliced technique, four ARC chips can operate in parallel to accommodate the line rate at 622 Mbit/s.

Our invention provides a circuit receiving cells and a mode control signal, for facilitating the routing, sorting, and grouping of the cells, each cell including address and priority information. The circuit includes switch element arrays and selective devices. The switch element arrays route and sort the cells based on the address and priority information to provide routed and sorted cells. A selective device is arranged between each of the switch element arrays and passes an appropriate one of the routed and sorted cells provided by a preceding switch element array and cells received by the circuit, to a next switch element array based on the mode control signal. The routed and sorted cells provided by the plurality of switch elements may be grouped based on the mode control signal. This circuits may be arranged to form a multicast grouping network comprising r rows of s columns of circuits. In each of the s columns, the routed and sorted cells provided by the switch element arrays of a circuit, are coupled with an input group of a lower adjacent circuit.

BRIEF DESCRIPTION OF THE DRAWINGS

FIGS. 6a and 6b are block diagrams of a 32×4 array of switch elements.

FIGS. 7a and 7b illustrate the "cross" and "toggle" states of a switch element while FIGS. 7c through 7g are timing diagrams of signals applied to a switch element.

FIGS. 12a and 12b illustrate the components of a switch element used in the ASIC chip of our invention.

DETAILED DESCRIPTION

Figure 3:
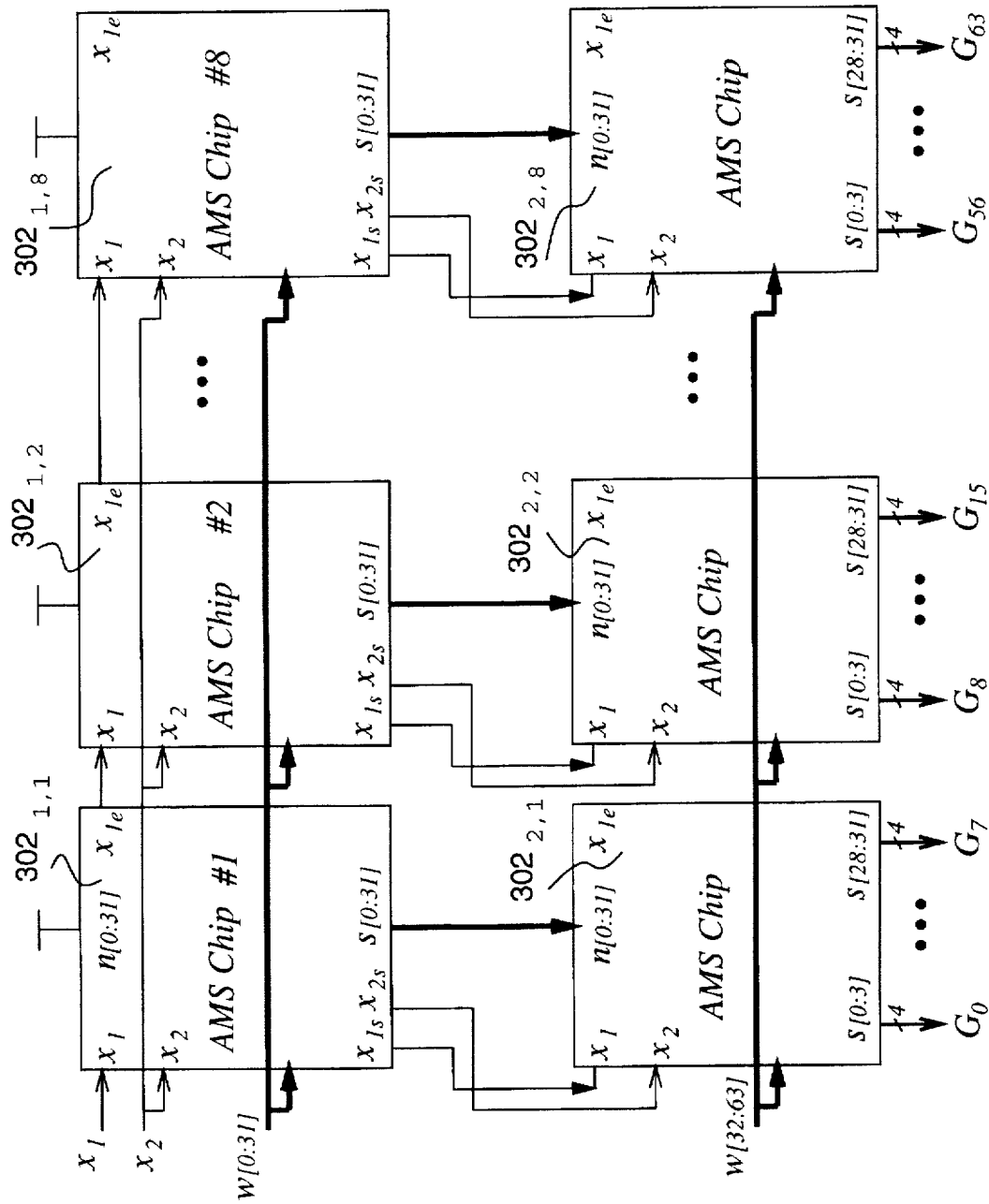
FIG. 3 is a schematic which illustrates a 64×64 ATM switch using ASIC chips of our invention.

FIG. 3 is one exemplary connection of our ASIC chips which forms a multicast grouping network (MGN) 104 used in a 64×64 ATM switch. In this case, the output group size is chosen to be four (4), meaning each output port will receive up to four (4) cells in one cell time slot. To reiterate, the term "cell time slot" means the time for one ATM cell to be transmitted at the prevailing line rate. For example, assuming a line rate of 155 Mbit/second, the cell time slot is 2.83 μs (=(53 bytes/cell*8 bits/byte*270/260)/155 Mbit/second). By cascading our ASIC chips in a number of rows and columns, a larger switch size can be obtained. As shown in FIG. 3, a 64×64 switch is implemented by connecting our ASIC chips in two (2) rows, each row having eight (8) chips.

Thus, the exemplary connection of FIG. 3 (i) receives 64 ATM cells w[0:64] from 64 input port controllers (IPCs) 102, (ii) routes the cells to appropriate output groups while simultaneously sorting the cells by priority, (iii) provides up to four (4) cells per cell time slot to each output buffer 106, and (iv) makes the lowest priority cell, winning output port contention, available for feedback to the input port controllers (IPCs) 102 so that they can determine whether their buffered cells were successfully routed through (i.e., won contention) to an output buffer 106.

The ATM cells w[0:64] are provided at the left (or "west") side of the array. Each cell has an address field and a priority field. The X0, X1, and X2 signals indicate the presence of the address and priority fields of the cells. (See e.g., FIGS.

7(d)–7(g)). The address and priority fields are used by the switch elements (SWEs) of our ASIC switch for properly routing cells in the switch element (SWE) array. Details regarding the use of these fields will be explained below.

Figure 1:
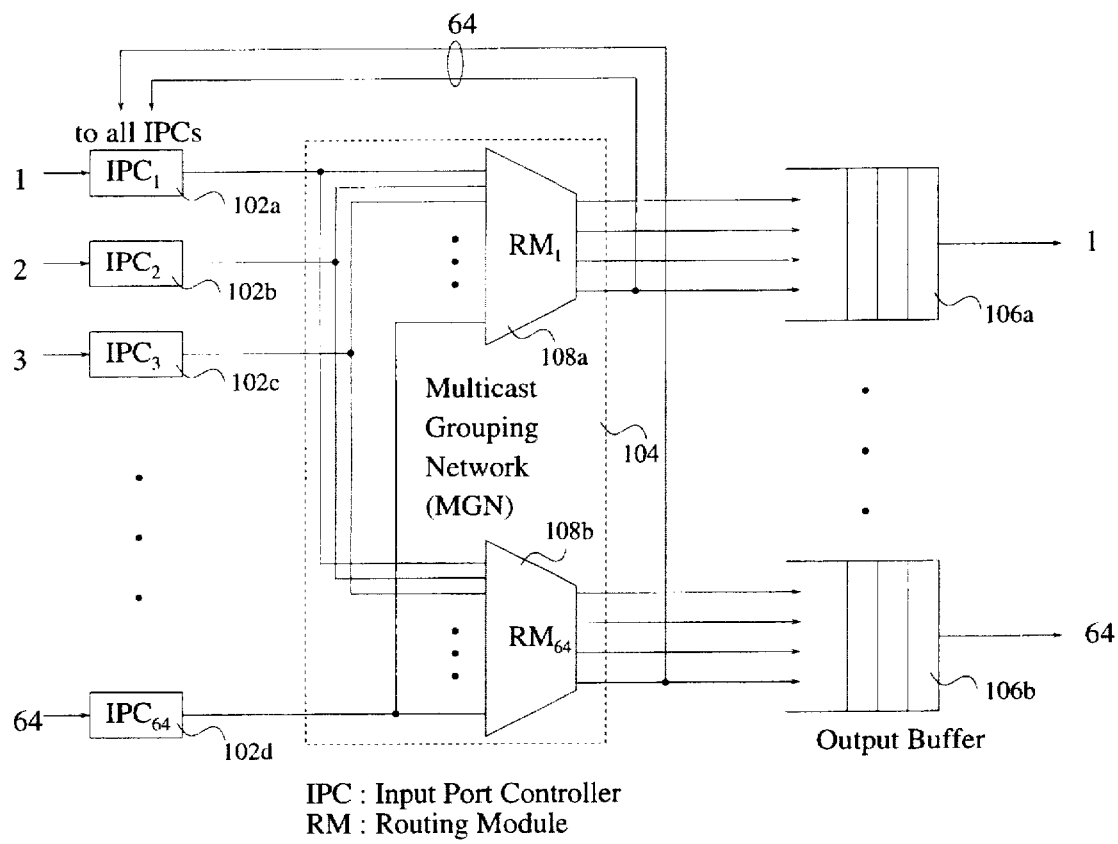
FIG. 1 is a schematic which illustrates a 64×64 ATM switch architecture as described in U.S. patent application Ser. No. 08/511,811.
Figure 2:
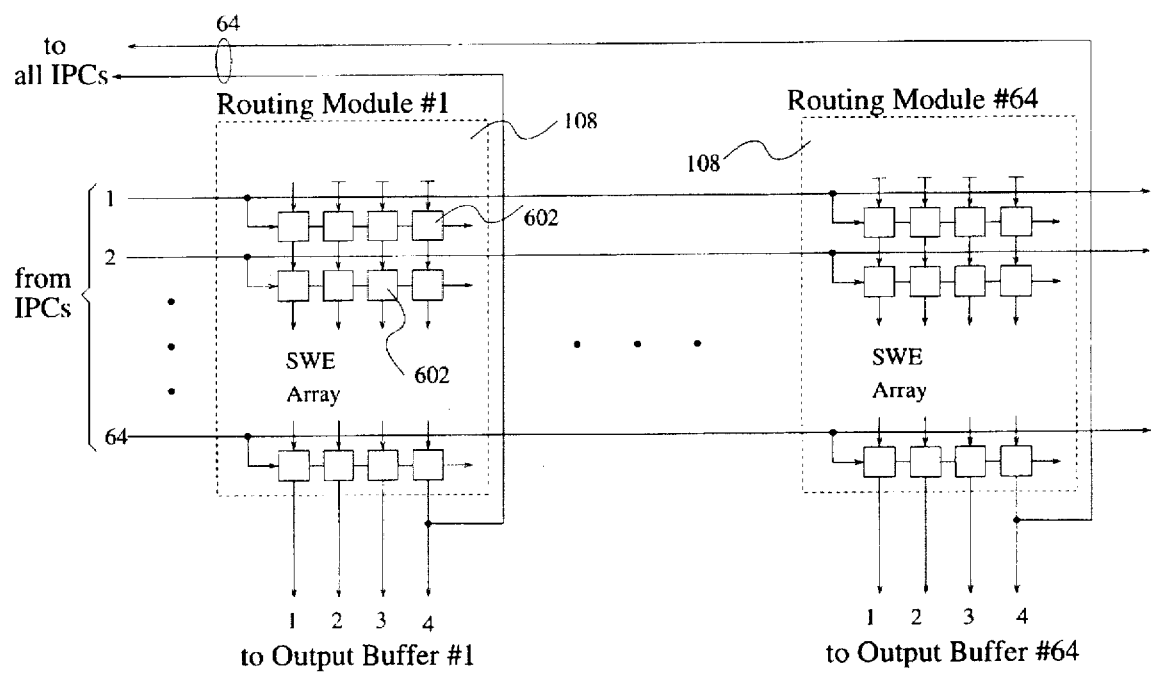
FIG. 2 is a schematic which illustrates routing modules of a multicast grouping network used in the ATM switch architecture of FIG. 1.

Again, sixty-four (64) input signals, w[0:63], are broadcast horizontally tour ASIC chips 302. The input signals w[0:63] are ATM cells provided, for example, by input port controllers (IPCs) 102. (See FIG. 1.) South outputs s[0:31] of the ASIC chips $302_{1,x}$ (where "x" is 1 to 8 in this example) of the first row are connected to the north inputs n[0:31] of the ASIC chips $302_{2,x}$ of the second row. The north inputs n[0:31] of the ASIC chips $302_{1,x}$ of the first row are tied to a high voltage level for multicast applications. That is, in the multicast mode, all dummy cells are fed with a stream of "1"s, indicating the lowest priority. In the multicast mode, the address comparison is in conformance with the X1 signal.

The south outputs s[0:3] ... s[28:31] of the ASIC chips $302_{2,x}$ of the second row go to an associated group of output buffers. (See e.g., elements 106 of FIG. 1.) Thus, at each output buffer, in one cell time slot, up to four (4) cells are stored and one (1) cell is transmitted. The arrangement of our ASIC chips 302 shown in FIG. 3 handles a line rate at OC-3 (i.e., 155 Mb/s). The line rate may be increased using a bit sliced technique, which will be described later.

Figure 5:
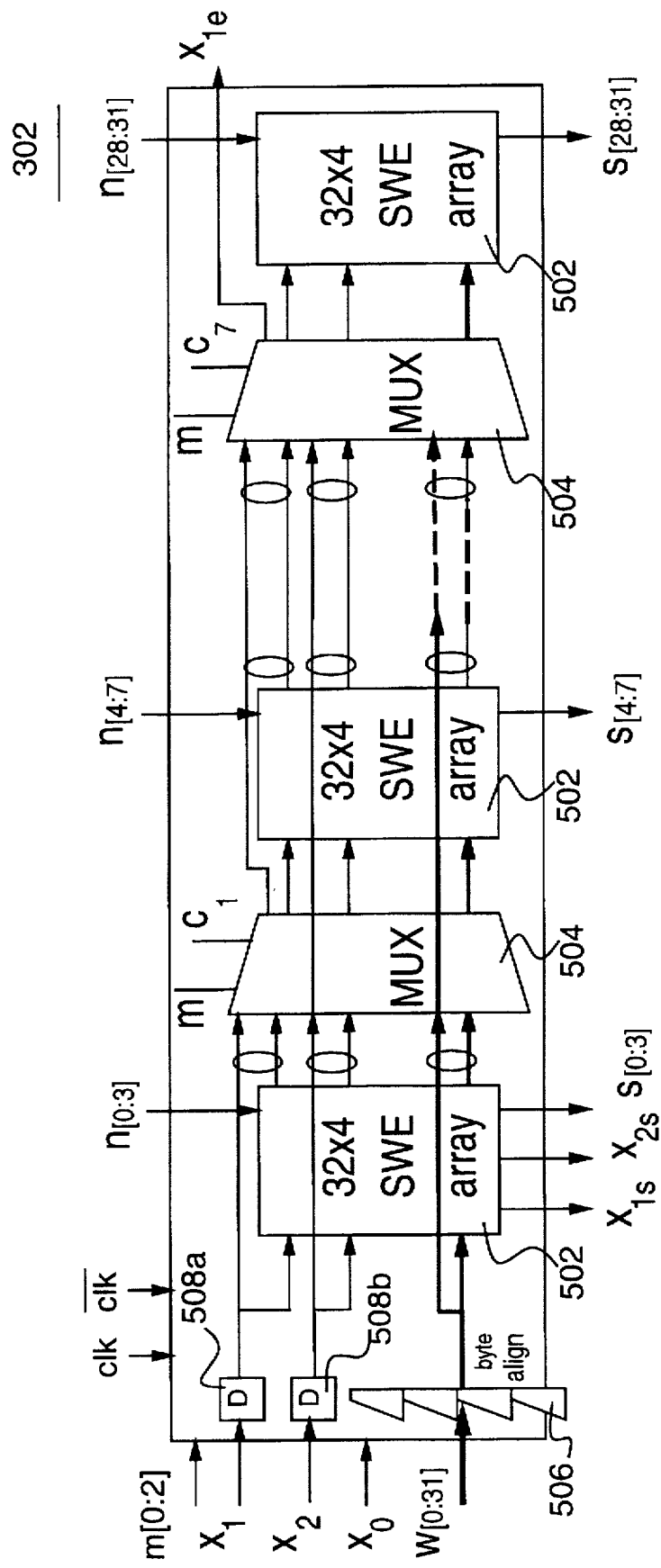
FIG. 5 is a block diagram of the ASIC chip of our invention.
Figure 7:
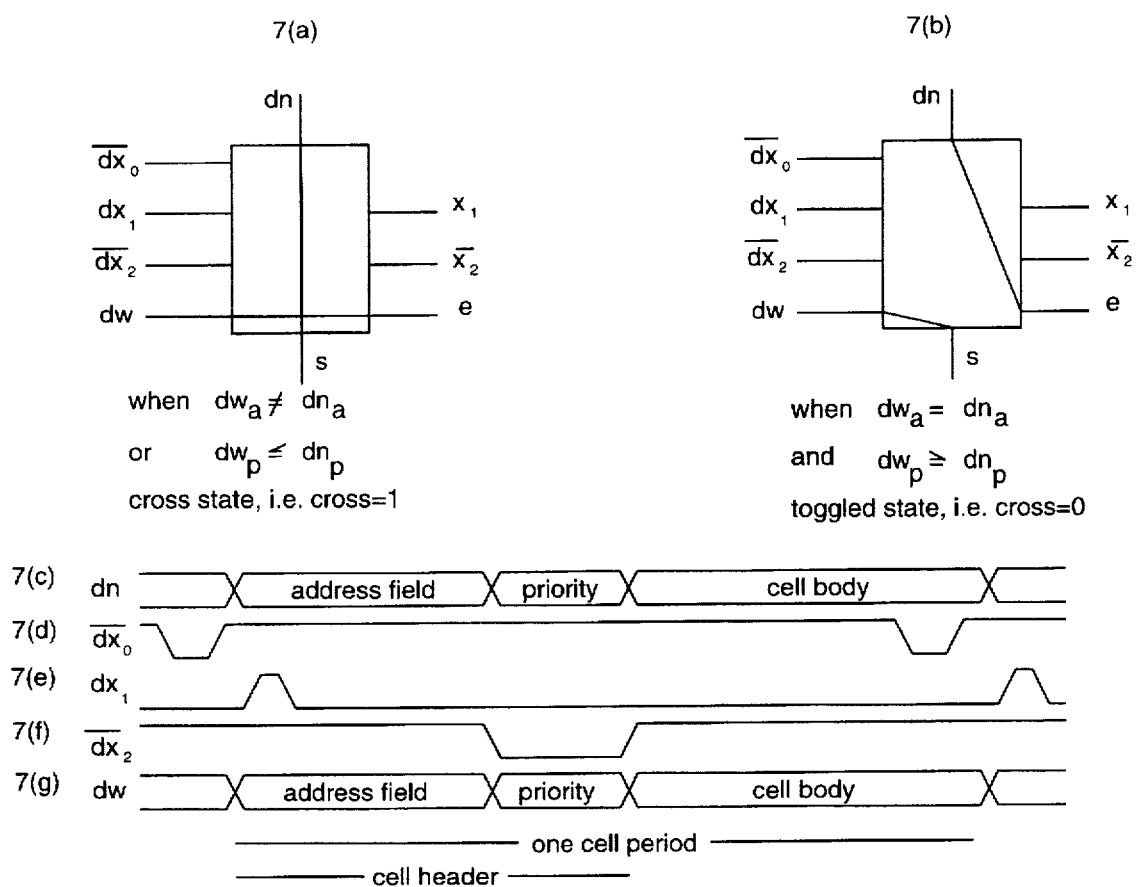

FIG. 5 is a block diagram of our ASIC chip 302. The ASIC chip 302 (i) receives 32 ATM cells w[0:31], (ii) routes the cells to an appropriate one or more of eight (8) output groups while simultaneously sorting the cells by priority, and (iii) provides up to four (4) cells to each of the eight (8) output groups s[0:3] ... s[28:31] per time slot. Our ASIC chip 302 contains an array of 32×32 switch elements (SWEs), which is partitioned into eight (8) SWE arrays 502, each with 32×4 SWEs. The switch arrays 502 are described below with reference to FIGS. 6(a), 6(b), 7(a) through 7(g), 12(a), 12(b) and 13. A set of input data signals (i.e., ATM cells), w[0:31], comes from the input port controllers (IPCs) 102. Another set of input data signals (i.e., ATM cells or "dummy" cells) n[0:31], either comes from the output, s[0:31] of an ASIC chip 302 on an upper row, or are tied to a high voltage level for the ASIC chips 302 on the first row (in the multicast case). A set of the output signals, s[0:31], either go to the north inputs n[0:31] of ASIC chips 302 of a lower row or go to an associated one of the output buffers 106.

A two-to-one multiplexer 504 is arranged between adjacent 32×4 SWE arrays 502 and facilitates a flexible configuration of output groups. The state of each of the seven (7) two-to-one multiplexers 504 is determined by an associated control signal C1–C7. The control signals are derived from the signals M0–M2.

The byte alignment circuits 504 ensure that cells applied to switch elements SWEs 602 are aligned, at the bit level, when they arrive at the switch elements SWEs 602. Specifically, if the byte alignment circuits 504 were not provided, the cells would have to be skewed, bit-by-bit, instead of byte-by-byte at the chip input.

The X0 signal is broadcast to all switch elements (SWEs) to initialize each switch element (SWE) to a cross state. In the cross state, the west input passes to the east output and the north input passes to the south output. (See e.g., FIG. 7(a)). The X1 signal indicates the presence of the address bit(s) used for routing cells, while the X2 signal indicates the presence of the priority field of the cell. Other "x" signals propagate along with cells to the adjacent arrays of switching elements (SWEs) or ASIC chips on the east or south side.

Figures 8A, 8B:
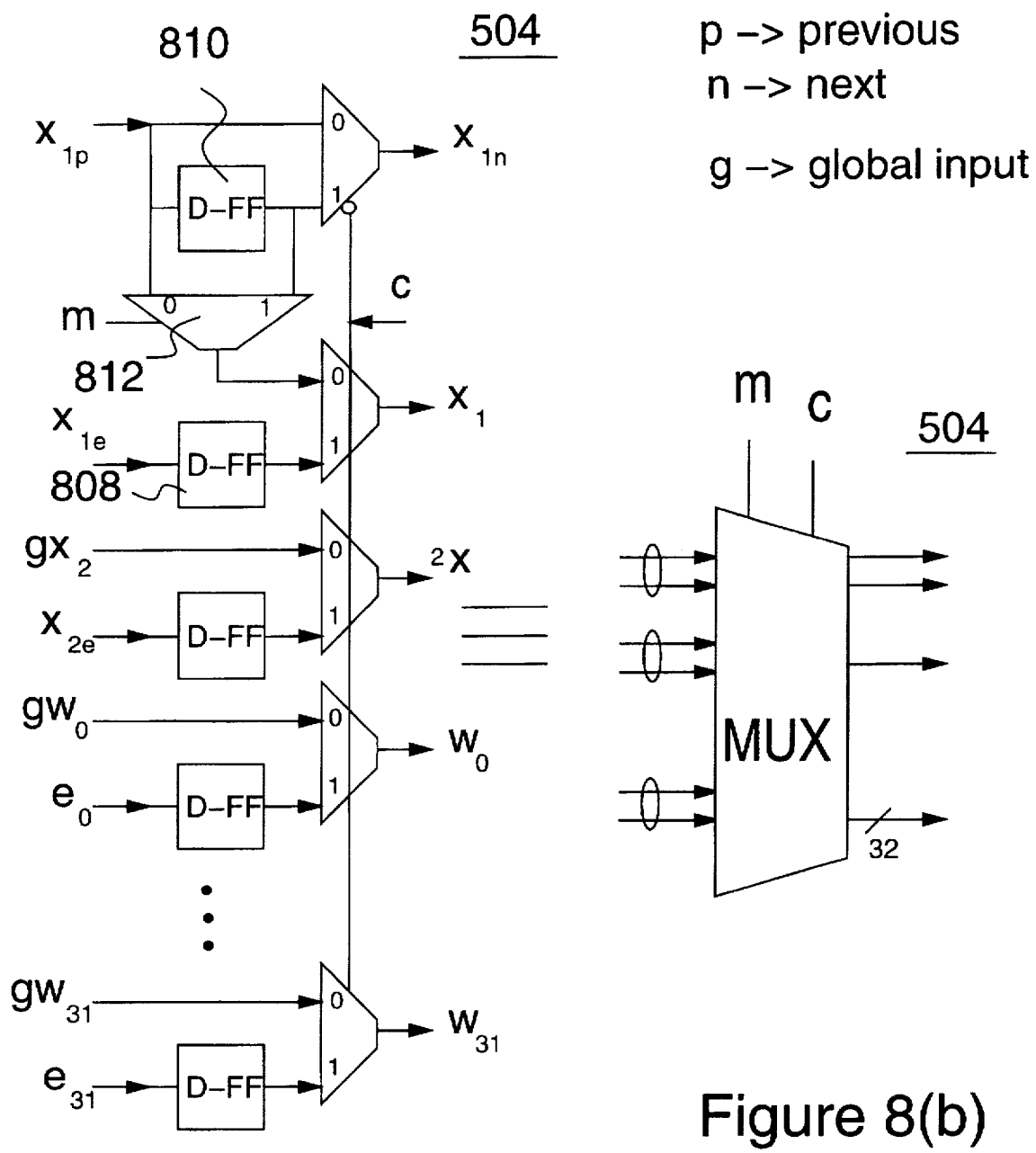
FIGS. 8a and 8b illustrate a two-to-one multiplexer arranged between every two (2) switch elements (SWE) arrays in our ASIC chip.

The details of the 32×4 arrays 502 are now described with reference to FIGS. 6(a) and 6(b). As shown in FIG. 6(a), the switch elements (SWEs) 602 are arranged in a cross-bar structure in which signals are only communicated between adjacent switch elements (SWEs) 602. This eases synchronization problems relative to other non-cross-bar structures which have may have interconnection cross-over and different connection lengths which increases synchronization difficulty. ATM cells are propagated in the array of switch elements (SWEs) 602, in a manner analogous to a wave propagating along the diagonal direction, toward the bottom right (or southwest) corner of the array. The X1 and X2 signals are applied from the top left of the switch element (SWE) array, and each switch element (SWE) distributes the X1, and X2 signals to adjacent switch elements (SWEs) at its right (east) and bottom (south). The X1 and X2 signals must have the same phase as (i.e., be synchronized with) the data signal (i.e., cells) arriving at each switch element (SWE) 602. (See e.g., FIGS. 7(c)–7(g)). Accordingly, the X1 and X2 signals are passed to the adjacent switch elements (SWEs) (east and south) after one clock cycle delay, as are data signals (w and n). This delay is accomplished with D-flip flops 508 (See FIG. 5) and 808 (See FIG. 8). The X0 signal is broadcast to all switch elements (SWEs) 602 (not shown in FIG. 6) to precharge an internal node in the switch element (SWE) thereby allowing it to be set to its cross state at the beginning of every cell cycle. When the chips are connected as shown in FIG. 3, the $X1_e$ output signal is used to identify the address bit position of the cells in the first 32×4 SWE array 502 of the next adjacent chip.

The circuit diagram of the switch element (SWE) is shown in FIG. 12(a). As shown in FIG. 12(b), the input signals dn and dw are applied to the top and left sides of the switching element (SWE), respectively. These signals are the outputs of two other switch elements (SWEs), one on the left and the other on the top. (Note, however, that the signal dw may be an ATM cell from an input port controller (IPC) 102 and the signal dn may be a generated "dummy" signal of the signal output of a top chip 302.) Since the X1 signals at the south and east sides of the switch element (SWE) have the same phase, they are tied together. This also applies to the X2 signals.

The timing diagrams of the input signals to a switching element (SWE) are shown in FIGS. 7(c) through 7(g). Two bit-aligned cells, one from the west dw and one from the north dn, are applied to the switching element (SWE) along with the dx1 and dx2 signals. To reiterate, the dx1 and dx2 signals indicate the presence of the address and priority fields of the input cells. Each switching element (SWE) has a cross state (See FIG. 7(a).) and a toggle state (See FIG. 7(b).) Initially, the switching element (SWE) is initialized to a cross state by the dX0 signal such that cells from the north side are routed to the south side, and cells from the west side are routed to the east side. When the address of the cell from the west ($dw_a$) matches with the address of the cell from the north ($dn_a$), and when the priority level of the west cell ($dw_p$) is higher than the priority level of the north cell ($dn_p$), the switch element (SWE) enters its toggle state such that the cell from the west side is routed to the south side, and the cell from the north is routed to the east. Otherwise the switching element (SWE) remains in its cross state.

Data inputs dn, dw and control inputs dx1, dx2 are first latched by D flip-flops 1204 and both inverted and non-inverted forms of these signals are available. The operation of the switch element (SWE) is described below with reference to FIG. 13. At the beginning of each cell period, X0 goes low (See FIG. 7(d)) to precharge node "A" to high through transistor T1 (T5, T6, and T7 are all opened (or blocking)). When X1 is high, node B is also precharged to high through transistor T3 (T8 and T9 are opened (or blocking)), forcing the switch element (SWE) to enter (or remain at) a cross state (i.e., the "cross" signal is high). As shown in FIG. 12a, the "cross" signal is applied to multiplexers 1206a and 1206b, such that when the "cross" signal is high, the north input is provided to the south output and the west input is provided to the east output, but when the "cross" signal is low, the north input is provided to the east output and the west input is provided to the south output. Once node A (or B) is precharged to the threshold of the following inverter, inv1 (or inv2), the output of the inverter will go low, which in turn turns on (closes) the weak p-transistor T2 (or T4). This will keep node A (or B) high as long as there is no path that will pull the node voltage to GND through a group of transistors lead by T5 or T6 (or T8).

When X1 is asserted, addresses of the north and the west inputs (na and wa) are compared bit by bit by a transistor group led by T5. If wa and na are different when the X1 signal is high, the T5 transistor group will discharge the voltage node A by connecting node A to ground. The output of the inverter (inv1) will then go high once the voltage of node A falls below the threshold of (inv1). In this case, the inverter (inv1) output turns on transistor T11 and forms a two-inverter latch, a positive feedback loop. This will pull down node A immediately, keeping node B high and keeping the switch element (SWE) in its cross state. Note that transistor T7 is always on except when node A is precharged during X0 low.

At each switching element (SWE), if the addresses of input cells match, their priorities are then compared bit by bit. The priority comparison will stop whenever the situation of n=0 and w=1 occurs. This means the priority level of the north cell has been determined to be higher than the priority level of the west cell. The comparison of priority field will stop at this point since there is no need to compare the following priority bits. This causes node A to be discharged to low through the T6 transistor group, which in turn prevents node B from being discharged and thus keeps the switching element (SWE) at the cross state. If, however, the priority level of the west cell is detected higher than the priority level of the north-cell (i.e., n=1 and w=0), node B is discharged through the T8 transistor group, toggling the switching element (SWE) from its cross state to its toggle state. That is, the "cross" signal will go low and, as a result, multiplexers 1206 will provide the north input to the east output and the west input to the south output. The transistor T11 plays the same role in discharging node B as the transistor T10 did for node A. Specifically, the inverter (inv2) output turns on the transistor T11 and forms a two-inverter latch, a positive feedback loop.

Evaluation paths T5, T6 and T8 use a mix of p-type and n-type transistors to phase align all gate signals for the transistors on the same evaluation path. The gate signals are phase aligned since each of the gate signals in a discharge path (i.e., node A to ground or node B to ground) are delayed by the same amount of time through the D flip-flops or D flip-flops and inverters. Otherwise, any small overlap between the gate signals may accidentally discharge node A (or B). This effect can easily be seen by SPICE simulation if p-type transistors are replaced with n-type transistors. Accordingly, some gate signals are required to be inverted. Using p-type transistors may increase the layout area and slow down the switching element (SWE) slightly, but the increase in the layout area is not significant. The performance of the switching element (SWE) can be improved if p-type transistors in evaluation paths are replaced by n-type transistors and two additional D flip-flops in each SWE are added to latch the inverse of data inputs, n and w. However, this approach requires more transistors and dissipates more dynamic power.

As shown in FIG. 5, a two-to-one multiplexer 504 is provided between adjacent 32×4 switch element (SWE) arrays 502. Each multiplexer 504 is provided with (i) an $X1_p$ (where "p" connotes "preceding") signal output by a preceding 32×4 array 502 and a delayed X1 signal, (ii) an $X2_p$ signal output by a preceding 32×4 array 502 and a global X2 signal gX2, (iii) a group of cells e[0:31] output by a preceding 32×4 array 502 and a global group of bit skewed west cells gw[0:31], (iv) an m (i.e., "mode") signal input, and (v) a c (i.e., "control") signal input. To reiterate, the seven (7) two-to-one muxes 504 provided between the eight (8) 32×4 SWE arrays 502 facilitate a flexible output group configuration. The structure and operation of the multiplexers 504 is described below with reference to FIGS. 8(a) and 8(b).

The two-to-one mux 504 between every two 32×4 arrays 502 selects data signals and X1, X2 signals based on the chip configuration. Different configurations are obtained by properly generating control C1,C2, . . . ,C7 signals from the m[0] and m[1] signals. The output group size is configured to: four (4) (See FIG. 9(a)) when m[1:0]=00; eight (8) (See FIG. 9(b)) when m[1 0]=01; sixteen (16) (See FIG. 9(c)) when m[1:0]=10; or thirty-two (32) (See FIG. 9(d)) when m[1:0] =11. The group size control signals C1–C7 are generated from the input signals m[1:0] as follows: C1=C3=C5=C7= m[1]+m[0] (where "+" indicates a logical OR); C2=C6=m [1]; and C4=m[1].m[0]. (where "." indicates a logical AND). The m[2] bit of the mode signal controls a one-bit delay for the X1 signal when the chip is operated in the multicast mode.

When the output group size is four (4), m[1]=0 and m[0]=0. Thus, C1=C3=C5=C7=m[1] OR m[0]=0 OR 0=0, C2=C6=m[1]=0, and C4=m[1] AND m[0]=0 AND 0=0. Accordingly, each of the seven (7) two-to-one multiplexers 504 outputs a delayed or non-delayed (depending on m[2], the multicast/unicast signal) global X1 signal, a global X2 signal, and global w[0:31] signals. (See e.g., FIGS. 8(a) and 9(a).) When the output group size is eight (8), m[1]=0 and m[0]=1. Thus, C1=C3=C5=C7=m[1] OR m[0]=0 OR 1=1, C2=C6=m[1]=0, and C4=m[1] AND m[0]=0 AND 1=0. Accordingly, the first, third, fifth, and seventh two-to-one multiplexers 504 provide a delayed X1 east signal as its X1 west output, a delayed X2 east signal as its X2 west output, and delayed e[0:31] signals as its w[0:31] outputs while the second, fourth, and sixth two-to-one multiplexers 504 provide a delayed or non-delayed (depending on m[2]) global X1 signal, a global X2 signal, and global w[0:31] signals. (See FIGS. 8(a) and 9(b).) When the output group size is sixteen (16), m[1]=1 and m[0]=0. Thus, C1=C3=C5=C7=m [1] OR m[0]=1 OR 0=1, C2=C6=m[1]=1, and C4=m[1] AND m[0]=1 AND 0=0. Accordingly, the first, second, third, fifth, sixth, and seventh two-to-one multiplexers 504 provide delayed X1 east signals as its X1 west outputs, a delayed X2 east signal as its X2 west output, and a delayed e[0:31] signal as its w[0:31] output while the fourth two-to-one multiplexer 504 provides a delayed or non-delayed (depending on m[2] global X1 signal, a global X2 signal, and global w[0:31] signals. (See e.g., FIGS. 8(a) and 9(c).) Finally, when the output group size is 32, m[1]=1 and m[0]=0. Thus, C1=C3=C5=C7=m[1] OR m[0]=1 OR 1=1, C2=C6=m[1]=1, and C4=m[1] AND m[0]=1 AND 1=1. Accordingly, each of the seven (7) two-to-one multiplexers 504 provides a delayed X1 east signal as its X1 west output, a delayed X2 east signal as its X2 west output, and delayed e[0:31] signals as its w[0:31] outputs. (See e.g., FIGS. 8(a) and 9(d).) As shown in FIG. 10, each of the four (4) byte alignment circuits 506 is basically a set of shift registers. The byte alignment circuits 506 ensure that cells are aligned, at the bit level, when they arrive at each switch element (SWE) even though they are byte-aligned at the chip inputs. Since each switch element (SWE) introduces a one-bit delay, if there were no byte-alignment circuit, input cells would have been required to be skewed, bit by bit, at the inputs of the chip.

Note that every group of eight (8) cells is byte skewed with respect to adjacent groups of eight (8) cells by the input port controllers (IPCs) 102, for example. Specifically, to ease the synchronization of the cells from input port controllers (IPCs) 102, the byte-alignment circuit 506 is used to allow the delay between cells from input port controllers (IPCs) to be a multiple of 8 bits for every set of 8 data inputs. For example, the delay between w0 to w8 inputs is one byte, the delay between w8 to w16 is one byte, the delay between w16 to w24 is one byte, and so on. However, cells arriving at w0 to W7 inputs are synchronized, cells at w8 to w15 inputs are synchronized, cells at w16 to w23 inputs are synchronized, and cells at w24 to w31 inputs are synchronized.

Figure 9A:
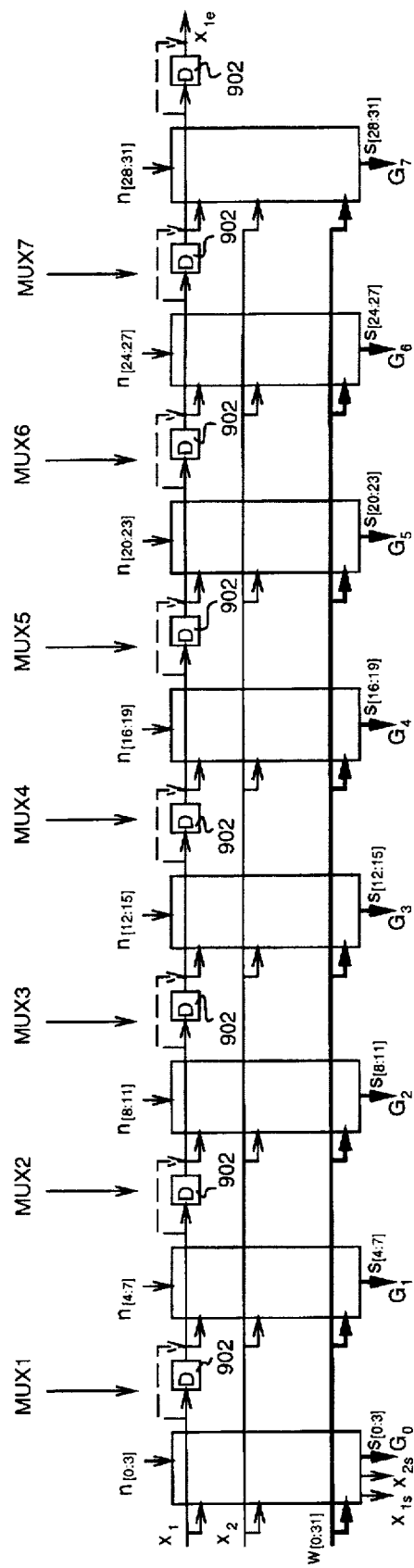
FIGS. 9a through 9d illustrate different arrangements of our ASIC chip for achieving different output groups.
Figure 9B:
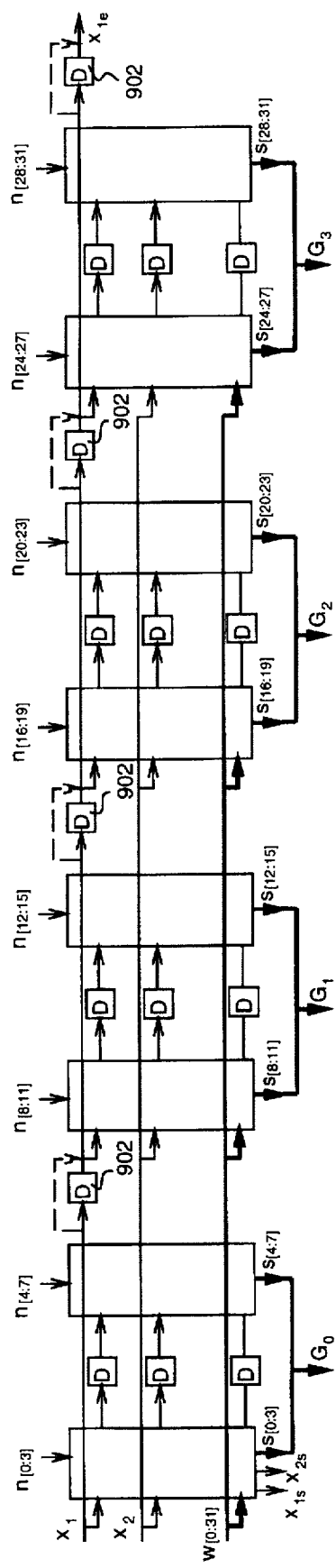
Figure 9C:
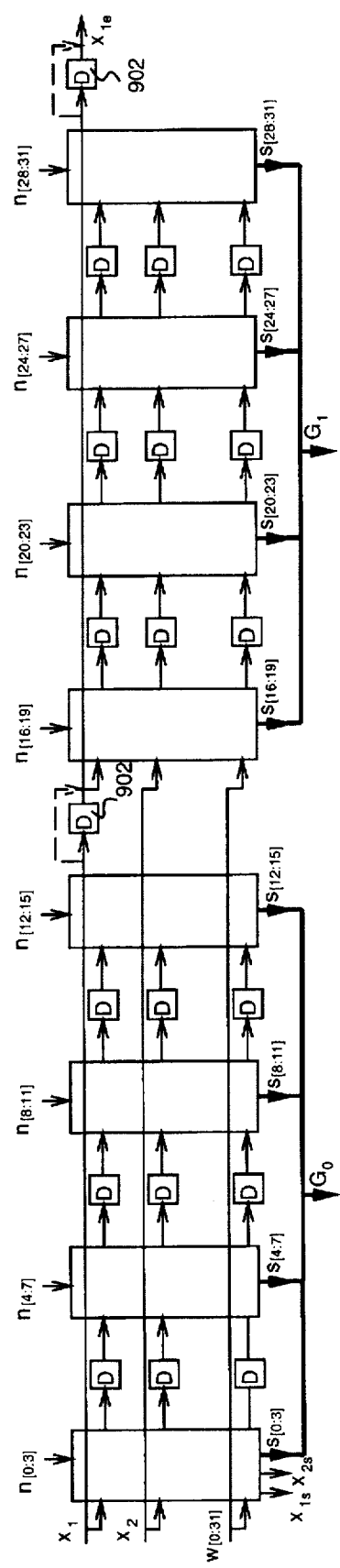
Figure 9D:
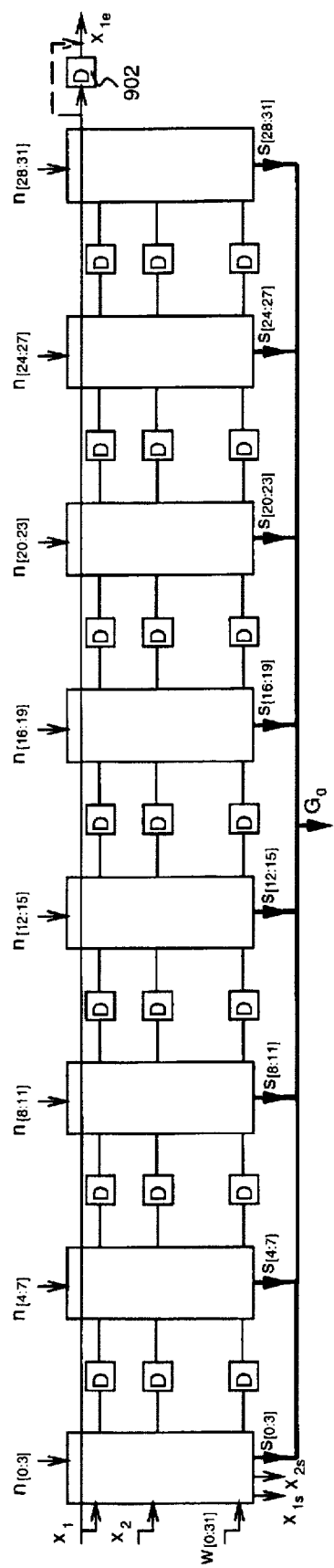
Figures 10A, 10B:
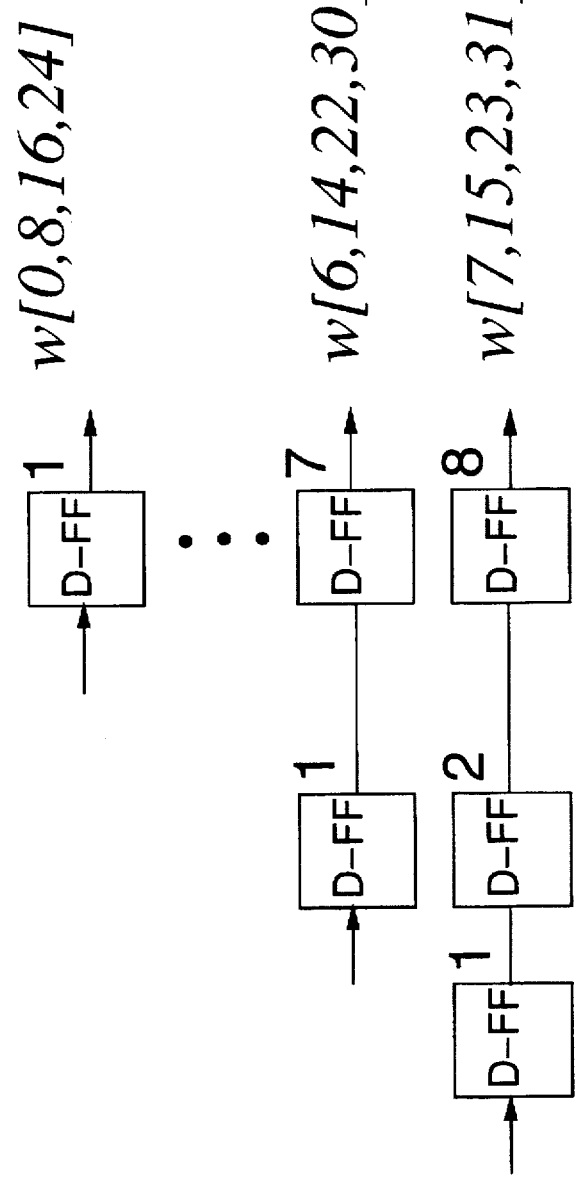
FIGS. 10a and 10b illustrate a circuit for aligning the bytes of input cells.

As shown in FIGS. 9(a) through 9(d), when the 32×4 switch element (SWE) arrays 502 are combined into a bigger SWE array (e.g., from four (4) links per group in FIG. 9(a) to eight (8) links per group in FIG. 9(b)), the data signals(w[0:31]) and field indication signals (X1 and X2) of each 32×4 switch element (SWE) array 502 are fed from the associated outputs of the 32×4 switch element (SWE) array 502 to its left based on the state of the seven (7) two-to-one multiplexers 504, as described above. Note that these signals are latched by the D-flip flops between the 32×4 switch element (SWE) arrays 502 (indicted as a D). This extra latching reduces the propagation time between two successive D flip-flops between two 32×4 arrays, thus increasing the clock speed of the switch system. When 32×4 switch element (SWE) arrays 502 are not combined, the data signals (w[0:31]) and X1, X2 signals of each 32×4 switch element (SWE) 502 array are provided from global inputs. (See e.g., FIG. 9(a).) Recall that the state of each of the two-to-one multiplexers 504 provided the global inputs to its outputs. Also note that under multicast operation of the switch, the X1 signal is delayed by one bit by a delay D flip-flop 902 between every two 32×4 switch element (SWE) arrays 502. (See e.g., FIG. 9(a).) This one bit delay of the X1 signal allows the address bit of the cell to be identified correctly in the next 32×4 switch element (SWE) array 502. Under unicast operation, the delay D flip-flop 902 is bypassed as shown by a dashed line in FIG. 9(a).

As described above with reference to the two-to-one multiplexers 504, west data inputs w[0:31] and the X2 signal of each 32×4 switch element (SWE) array 502 are chosen either from the global inputs (non-grouped case) (See e.g., FIG. 9(a).) or from the outputs of the 32×4 switch element (SWE) array 502 on the left (grouped case). (See e.g., FIGS. 9(b) through 9(d).) The X1 signal of each 32×4 switch element (SWE) array 502 is selected from three possible inputs: (1) directly from the global input (unicast, non-grouped case) (See e.g., GX1 provided to "0" input of mux 812 of FIG. 8(a).), (2) from the global input with some bits delay (multicast, non-grouped case) (See e.g., GX1, delayed by D flip-flop 810, provided to "1" input of mux 812 of FIG. 8(a).), or (3) from the output of the 32×4 switch element (SWE) array 502 on the left with one bit delay (grouped case for either unicast or multicast operation) (See e.g., X1$_e$, delayed by D flip-flop 808, of FIG. 8(a).).

To reiterate the description of the states of the seven (7) two-to-one multiplexers 504 in each of the four output grouping configurations, the m[0:1] signals are used to configure the chip into four different group sizes: (i) eight (8) groups, each with four (4) output links (See FIG. 9(a)), (ii) four (4) groups, each with eight (8) output links (See FIG. 9(b)), (iii) two (2) groups, each with sixteen (16) output links (See FIG. 9(c)), and (iv) one (1) group with thirty-two (32) output links (See FIG. 9(d)). The m[2] signal is used to configure the chip for either unicast or multicast operation. For unicast operating, the m[2] signal is set to 0, while for multicast operation, the m[2] signal is set to 1.

Figure 11:
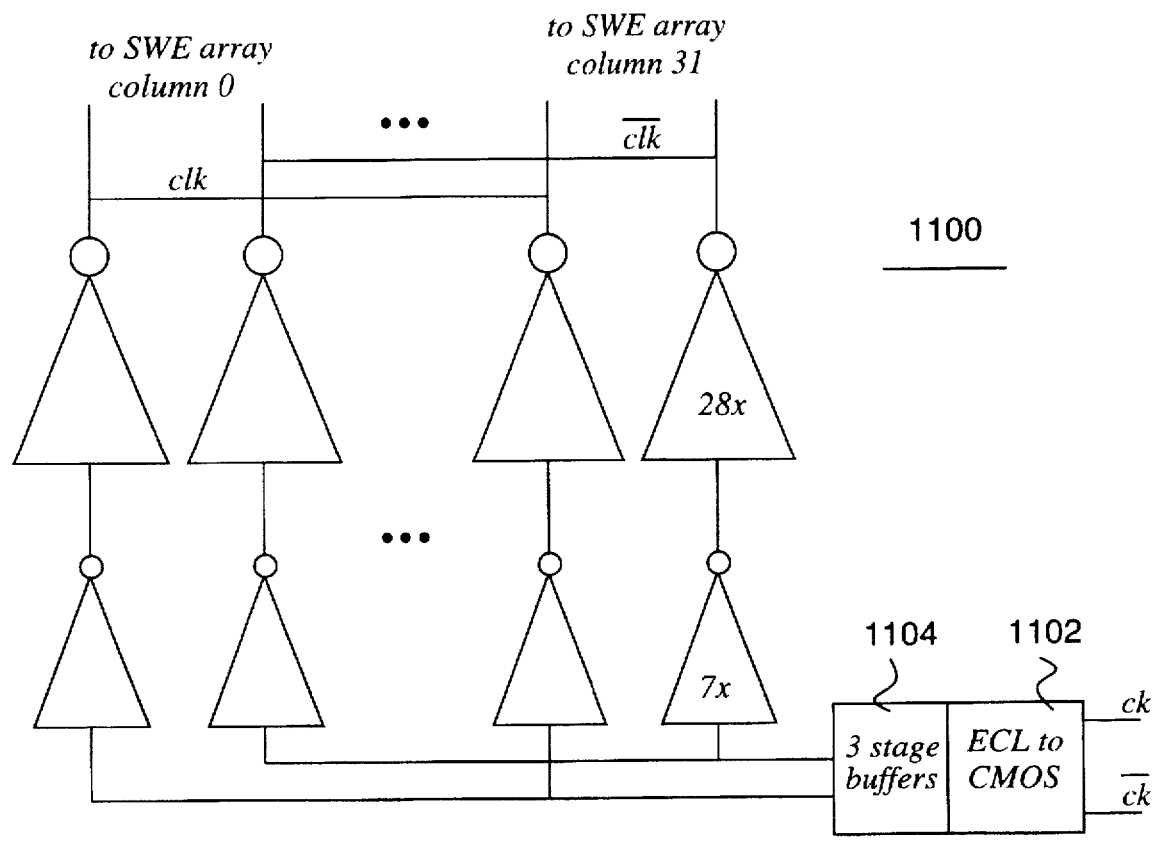
FIG. 11 is a block schematic of a circuit for performing clock distribution.
Figure 13:
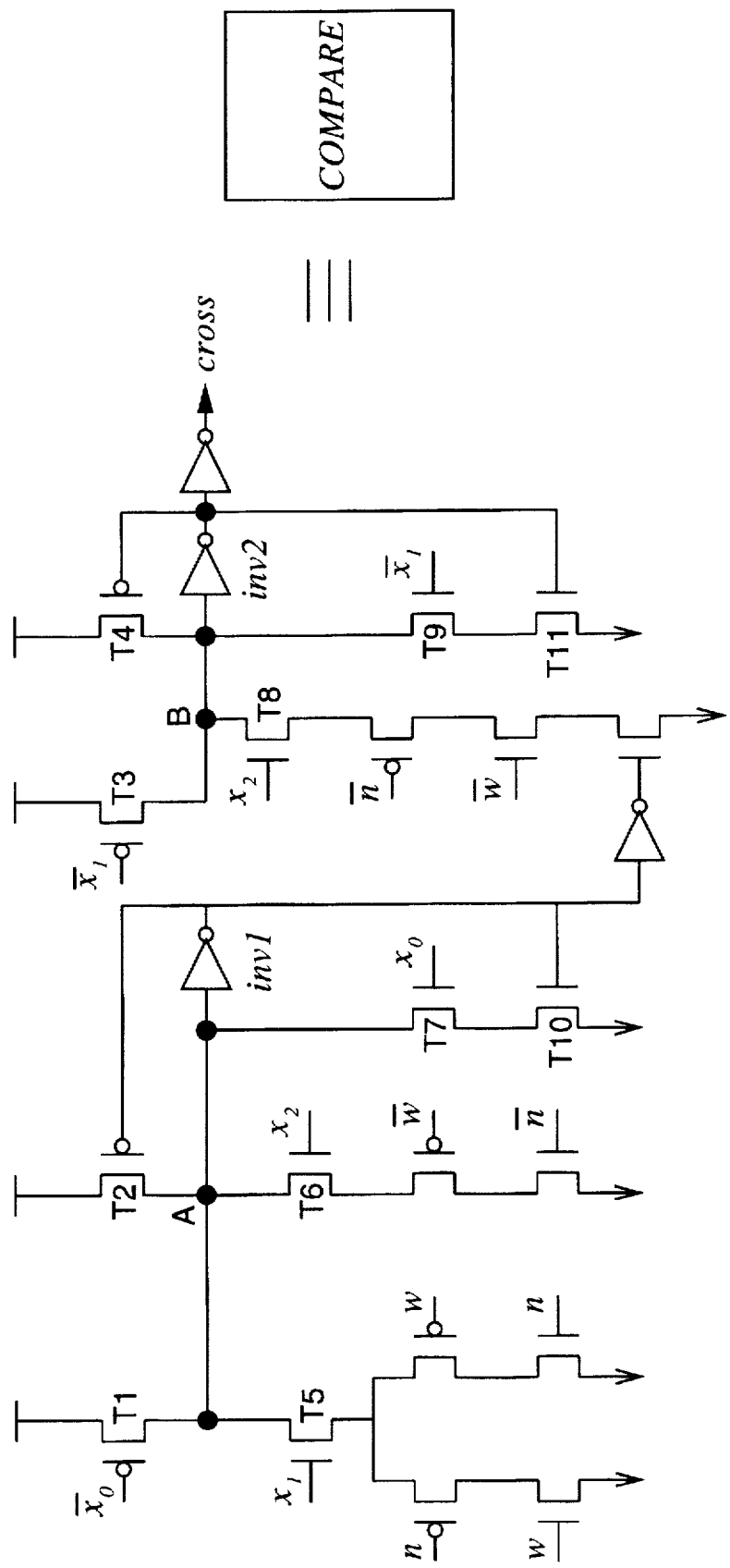
FIG. 13 is a schematic of a compare circuit provided in the switch element of FIG. 12.

The clock signals, clk and $\overline{\text{clk}}$, are applied with pseudo emitted coupled logic (or "ECL") inputs, positive one-volt peak-to-peak signals. Off-the-shelf ECL components capable of generating and distributing clock signals at a few hundred MHz are available. These ECL signals will be shifted from negative to positive levels when interfacing with the our ASIC chip. A clock distribution circuit 1100 in the ARC chip is shown in FIG. 11. The differential pseudo ECL clock inputs are first converted to CMOS levels by using a 2-stage differential amplifier 1102 followed by 3-stage CMOS buffers 1104. The final two stages of the clock buffers are distributed along the bottom of the die, such that one two-stage clock buffer is provided for each column of 32×4 array 502 to obtain a smaller clock skew. A 28X clock buffer is used to drive the SWEs on each of the 32 columns of switch elements (SWEs) 602, where 1X is the smallest inverter used in the chip and where 28X means the transistor is 28 times the smallest inverter size.

The capacitive load on the clock signals in each switching element (SWE) is about 56.8 fF (femto or $10^{-15}$ Farad) of which 40.8 fF (=4×10.2 fF) is due to the loading of four (4) D flip-flops and 16 fF is due to the loading of the local wire. The 5mm global clock wire from the 28X driver to each switch element (SWE) on the same column has a total estimated capacitance of 0.53 pF (pico or 10−12 Farad). Thus, the total capacitance of each column is 2.36 pF(=0.53 pF+32×56.8 fF). The distributed capacitance of the 5 mm metal wire becomes 0.47 fF/μm(=2.36 pF/5 mm). The delay associated with the length of the wire can be formulated as $t_d=r*c*1^2/2$ (See the text, N. Weste et al., *Principle of CMOS VLSI Design: A Systems Perspective*, pp. 200, Addison Wesley, 2d Edition (1993)) where r,c,l are the unit wire resistance, distributed capacitance, and the total wire length, respectively. For the values of r=0.09 Ω/μm for the metal wire, c=0.47 fF/μm, and l=5 mm, the maximum delay skew for the clock signal at different SWEs can be as large as 530 ps. Note that this delay would be about 5 ns if only one big clock driver distributing the clock signal globally were used. To further reduce the clock skew to 132 ps, additional smallest inverters 1202 may be added as clock drivers in each switch element (SWE) (See FIG. 12(a)). This reduces the distributed capacitance to 0.17 fF/μm, (0.53 pF+32×10.2 fF)/5 mm. Since signals only flow between adject switch elements (SWEs), the clock skew of 132 ps will not cause a problem at the speed of 330 MHz, at which our ASIC chip operates.

Figure 4:
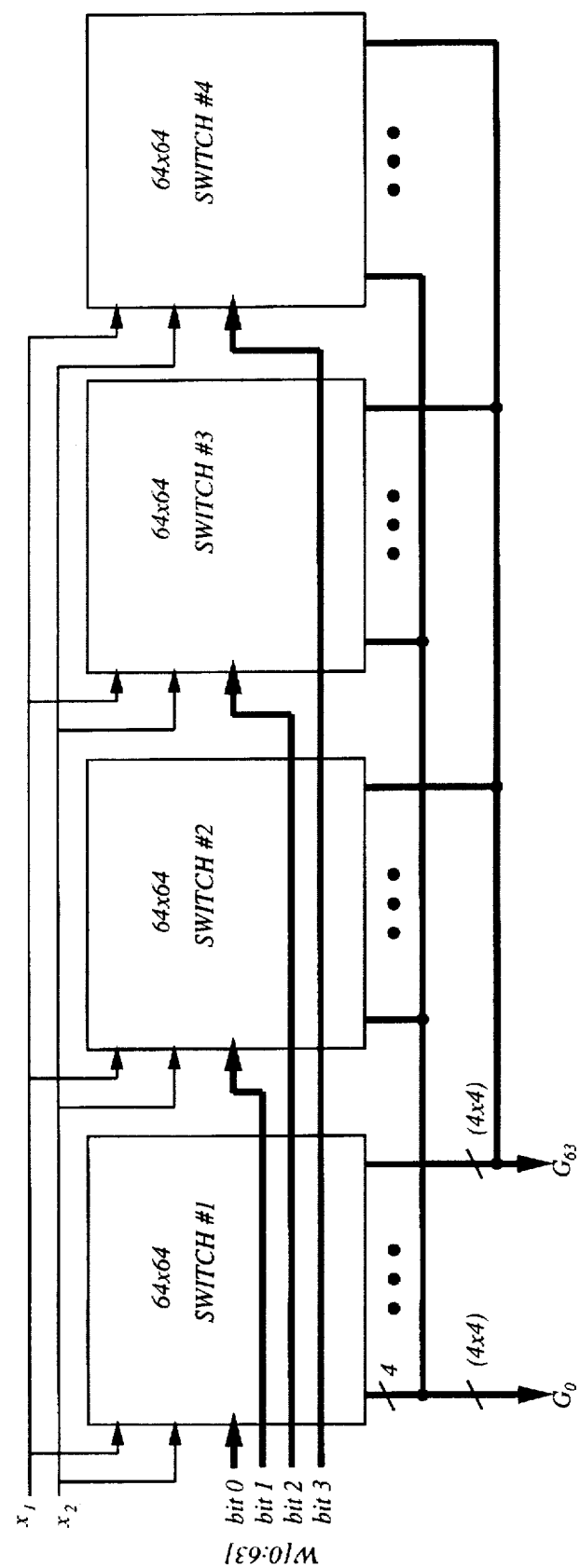
FIG. 4 is a schematic which illustrates a high line rate 64×64 ATM switch using ASIC chips of our invention in a bit-sliced arrangement.

By using a bit sliced technique, a switch realized with an arrangement of our ASIC chip 302 can accommodate a higher line rate than OC-3. For instance, FIG. 4 shows a 64×64 switch which can accommodate an input line rate at OC-12 (i.e., 622 Mb/s). In this case, four (4) 64×64 switch planes (see FIG. 3) are connected in parallel. The OC-12 bit stream is converted to four serial bit streams by a time-division multiplexer, and each switch plane (see FIG. 3) handles an associated bit stream. Since the same routing information is attached to each bit stream, the bit streams of the same cell will appear at the same output link of each switch plane. Therefore, they can easily be grouped to the same output port, as shown in FIG. 4.

What is claimed is:

1. A circuit for facilitating the routing, sorting, and grouping of cells, each cell including address and priority information, the circuit comprising:
   a) a first group of inputs for receiving a first group of input cells;
   b) a second group of inputs for receiving a second group of input cells;
   c) timing signal inputs for receiving a switch set timing signal, an address timing signal, and a priority timing signal;
   d) a mode input for receiving a mode signal;
   e) a clock signal input for receiving a clock signal;
   f) a group of outputs for providing a group of output cells;
   g) a first timing output for providing a first delayed address timing signal and a first delayed priority timing signal;
   h) a second timing output for providing a second delayed address timing signal;
   i) a plurality, N, of switch element arrays, each of the N switch element arrays having
      i) a first group of inputs for receiving a first group of M input cells,
      ii) a second group of inputs, coupled with M/N of the second group of inputs of the circuit, for receiving a second group of M/N input cells,
      iii) an address timing input for receiving an address timing signal,
      iv) a priority timing input for receiving a priority timing signal,
      v) a first group of outputs for providing a first group of M output cells,
      vi) a second group of outputs, coupled with M/N of the group of outputs of the circuit, for providing a second group of M/N output cells,
      vii) a first address output, coupled with the first timing output of the circuit, for providing a first delayed address timing signal,
      viii) a first priority output, coupled with the first timing output of the circuit, for providing a first delayed priority timing signal,
      ix) a second address output for providing a second delayed address timing signal, and
      x) a second priority output for providing a second delayed priority timing signal; and
   j) a plurality, N−1, of multiplexers arranged between adjacent ones of the N switch element arrays, each one of the N−1 multiplexers having
      i) a mode input, coupled with the mode input of the circuit, for receiving a multicast/unicast mode signal which is a portion of the mode signal received by the mode input of the circuit,
      ii) a control input for receiving a control signal corresponding to the particular multiplexer, wherein the control signal is derived from the mode signal provided to the mode input port of the circuit,
      iii) a first address timing input for receiving a first candidate address timing signal,
      iv) a second address timing input, coupled with the second address output of a preceding switch element array, for receiving a second candidate address timing signal,
      v) a first priority input, coupled with the timing signal inputs, for receiving a first candidate priority timing signal,
      vi) a second priority input, coupled with the second priority output of the preceding switch element array, for receiving a second candidate priority timing signal,
      vii) a first group of inputs, coupled with the first group of inputs of the circuit, for receiving a first group of candidate input cells,
      viii) a second group of inputs, coupled with the first group of outputs of the preceding switch element array, for receiving a second group of candidate input cells,
      ix) a mux output, coupled with the first address timing input of a next multiplexer, for providing a mux address timing signal,
      x) an address output, coupled with the address timing input of a next switch element array, for providing an address timing signal,
      xi) a priority output, coupled with the priority timing input of the next switch element array, for providing a priority timing signal, and
      xii) a group of outputs, coupled with the first group of inputs of the next switch element array, for providing a group of output cells.

2. The circuit of claim 1 further comprising:
   k) a first D flip-flop being provided with a clocking signal based on the clock signal received by the clock input of the circuit and having
      i) an input, coupled with one of the timing signal inputs of the circuit, for receiving the address timing signal, and
      ii) an output, coupled with both the address timing input of a first one of the N switch element arrays and the first address input of a first one of the N−1 multiplexers; and
   l) a second D flip-flop being provided with the clocking signal and having
      i) an input, coupled with another one of the timing signal inputs of the circuit, for receiving the priority timing signal, and
      ii) an output, coupled with the priority timing input of the first one of the N switch element arrays as well as the first priority input of each of the N−1 multiplexers.

3. The circuit of claim 1 wherein the mux output of a last of the N−1 multiplexers is coupled with the second timing output of the circuit.

4. The circuit of claim 2 wherein the mux output of a last of the N−1 multiplexers is coupled with the second timing output of the circuit.

5. The circuit of claim 1 further comprising:
   k) a byte align series circuit, the byte align series circuit having a plurality of byte align circuits, each of the byte align circuits having:
      eight inputs coupled with a corresponding eight of the first group of inputs of the circuit, and
      eight outputs coupled with a corresponding eight of the first group of inputs of each of the N switch element arrays,
      a first of the eight inputs being provided to a first of the eight outputs with a first delay, a second of the eight inputs being provided to a second of the eight outputs with a second delay which is twice that of the first delay, a third of the eight inputs being provided to a third of the eight outputs with a third delay which is three times that of the first delay, a fourth of the eight inputs being provided to a fourth of the eight outputs with a fourth delay which is four times that of the first delay, a fifth of the eight inputs being provided to a fifth of the eight outputs with a fifth delay which is five times that of the first delay, a sixth of the eight inputs being provided to a sixth of the eight outputs with a sixth delay which is six times that of the first delay, a seventh of the eight inputs being provided to a seventh of the eight outputs with a seventh delay which is seven times that of the first delay, and an eighth of the eight inputs being provided to an eighth of the eight outputs with an eighth delay which is eight times that of the first delay.

6. The circuit of claim 1 wherein each of the N switch element arrays includes an M by M\N array of switch elements, each of the switch elements having:
   a) a first timing input provided with a derivative address timing signal derived from the address timing signal received at the address timing input of the switch element array;
   b) a second timing input provided with a derivative priority timing signal derived from the priority timing signal received at the priority timing input of the switch element array;
   c) a north input provided with a derivative north input signal which is derived from a corresponding one of the second group of M/N input cells received by the second group of inputs of the switch element array;
   d) a west input provided with a derivative west input signal which is derived from a corresponding one of the first group of M input cells received by the first group of inputs of the switch element array;
   e) a clock input;
   f) an east output; and
   g) a south output,
   wherein, each of the switch elements has a cross state in which its north input is coupled with its south output and its west input is coupled with its east output, and a toggle state in which its north input is coupled with its east output and its west input is coupled with its south output.

7. The circuit of claim 6 wherein each of the switch elements assumes the toggle state if the address of a cell received at its west input equals the address of a cell received at its north input and the priority of the cell received at its west input is greater than or equal to the priority of the cell received at its north input and assumes the cross state otherwise.

8. The circuit of claim 6 wherein, in each of the switch elements, the north input is coupled with the south output of a vertically preceding switch element, the west input is coupled with the east output of a horizontally preceding switch element, the south output is coupled with the north input of a vertically next switch element, and the east output is coupled with the west output of a horizontally next switch element.

9. The circuit of claim 6 wherein each of the switch elements includes:
   a) a comparison circuit for comparing address and priority fields of cells provided at its north and west inputs and for generating a state selection signal based on the comparison; and
   b) a state selection circuit for selecting one of the cross state and the toggle state based on the state selection signal generated by the comparison signal.

10. The circuit of claim 9 wherein the state selection circuit includes:
   a) a first two-to-one multiplexer having a first input coupled with the west input of the switch, a second input coupled with the north input of the switch, a control input provided with the state selection signal generated by the comparison circuit, and an output coupled with the south output of the switch; and
   b) a second two-to-one multiplexer having a first input coupled with the north input of the switch, a second input coupled with the west input of the switch, a control input provided with the state selection signal generated by the comparison circuit, and an output coupled with the east output of the switch.

11. The circuit of claim 9 wherein the comparison circuit includes:
   a) a first transistor having an inverted gate provided with the switch set timing signal, a first leg coupled with a supply voltage, and a second leg defining a first node;
   b) a second transistor having an inverted gate defining a second node, a first leg coupled with the supply voltage, and a second leg coupled with the first node;
   c) a third transistor having an inverted gate being provided with an inverted first timing input, a first leg coupled with the supply voltage, and a second leg defining a third node;
   d) a fourth transistor having an inverted gate defining a fourth node, a first leg coupled with the supply voltage, and a second leg coupled with the third node;
   e) a fifth transistor having a gate provided with the first timing signal, a first leg coupled with the first node, and a second leg;
   f) a sixth transistor having a gate provided with an inverted second timing signal, a first leg couple with the first node, and a second leg;
   g) a seventh transistor having a gate provided with the switch set timing signal, a first leg coupled with the first node, and a second leg;
   h) an eighth transistor having a gate provided with the inverted second timing signal, a first leg coupled with the third node, and a second leg;
   i) a ninth transistor having a gate provided with the inverted first timing signal, a first leg coupled with the third node, and a second leg;
   j) a tenth transistor having a gate coupled with the second node, a first leg coupled with the second leg of the seventh transistor, and a second leg coupled with ground;
   k) an eleventh transistor having a gate coupled with the fourth node, a first leg coupled with the second leg of the ninth transistor, and a second leg coupled with ground;
   l) a twelfth transistor having an inverted gate provided with an inverted north input, a first leg coupled with the second leg of the eighth transistor, and a second leg;
   m) a thirteenth transistor having a gate provided with an inverted west input, a first leg coupled with the second leg of the twelfth transistor, and a second leg;
   n) a fourteenth transistor having a gate, a first leg coupled with the second leg of the thirteenth transistor, and a second leg coupled with ground;
   o) a fifteenth transistor having an inverted gate provided with an inverted west input, a first leg coupled with the second leg of the sixth transistor, and a second leg;

p) a sixteenth transistor having a gate provided with an inverted north input, a first leg coupled with the second leg of the fifteenth transistor, and a second leg coupled with ground;

q) a seventeenth transistor having an inverted gate provided with the north input, a first leg coupled with the second leg of the fifth transistor, and a second leg;

r) an eighteenth transistor having a gate provided with the west input, a first leg coupled with the second leg of the seventeenth transistor, and a second leg coupled with ground;

s) a nineteenth transistor having an inverted gate provided with a west input, a first leg coupled with the second leg of the fifth transistor, and a second leg;

t) a twentieth transistor having a gate provided with the north input, a first leg coupled with the second leg of the nineteenth transistor, and a second leg coupled with ground;

u) a first inverter having an input coupled with the first node and an output coupled with the second node;

v) a second inverter having an input coupled with the third node and an output coupled with the fourth node;

w) a third inverter having an input coupled with the second node and an output coupled with the gate of the fourteenth transistor; and x) a fourth inverter having an input coupled with the fourth node and an output providing the state selection signal.

12. The circuit of claim 1 wherein each of the N−1 multiplexers includes:

a) a first delay element;

b) a second delay element;

c) a third delay element;

d) a group of delay elements;

e) a first two-to-one mux having a first input coupled with the first address timing input of the multiplexer, a second input coupled with the first address timing input via the first delay element, a control input coupled with the mode input of the multiplexer, and an output;

f) a second two-to-one mux having a first input coupled with the first address timing input of the multiplexer, a second input provided with the first address timing input of the multiplexer via the first delay element, an inverted control input coupled with the control input of the multiplexer, and an output coupled with the mux output of the multiplexer;

g) a third two-to-one mux having a first input coupled with the output of the first two-to-one mux, a second input provided with the second address timing input of the multiplexer via the second delay element, a control input coupled with the control input of the multiplexer, and an output coupled with the address output of the multiplexer;

h) a fourth two-to-one mux having a first input coupled with the first priority input of the multiplexer, a second input coupled with the second priority input of the multiplexer via the third delay element, a control input coupled with the control input of the multiplexer, and an output coupled with the priority output of the multiplexer; and i) a string of two-two-one muxes, each two-to-one mux of the string of two-two-one muxes having a first input coupled with a corresponding one of the first group of inputs of the multiplexer, a second input coupled with a corresponding one of the second group of inputs of the multiplexer via a corresponding one of the group of delay elements, a control input coupled with the control input of the multiplexer, and an output coupled with a corresponding one of the group of outputs of the multiplexer.

13. The circuit of claim 12 wherein the control input signal of each of the N−1 multiplexers is derived from the mode signal received by the mode input of the circuit.

14. The circuit of claim 13 the control signals are used to permit second groups of outputs of the N switch element arrays to be flexibly combined.

15. The circuit of claim 1 wherein the control signals are used to permit second groups of outputs of the N switch element arrays to be flexibly combined.

16. The circuit of claim 15 wherein, in a first mode, the second groups of outputs of the N switch element arrays are not combined.

17. The circuit of claim 16 wherein, in a second mode, the second output groups of outputs of every two of the N switch element arrays are combined.

18. The circuit of claim 17 wherein, in a third mode, the second output groups of outputs of every four of the N switch element arrays are combined.

19. The circuit of claim 18 wherein, in a fourth mode, the second output groups of outputs of every eight of the N switch element arrays are combined.

20. The circuit of claim 15 wherein, for each mode Z, the second groups of outputs of $2^{(z-1)}$ of the N switch element arrays are combined.

21. A circuit receiving cells and a mode control signal, for facilitating the routing, sorting, and grouping of the cells, each cell including address and priority information, the circuit comprising:

a) a plurality of switch element arrays for routing and sorting the cells based on the address and priority information to provide routed and sorted cells; and b) selective devices, arranged between each of the plurality of switch element arrays, for passing an appropriate one of the routed and sorted cells provided by a preceding one of the plurality of switch element arrays and cells received by the circuit, to a next of the plurality of switch element arrays based on the mode control signal.

22. The circuit of claim 21 wherein the routed and sorted cells provided by the plurality of switch elements are grouped based on the mode control signal.

23. A multicast grouping network comprising R rows of S columns of circuits, each of the r×s circuits receiving cells and a mode control signal, facilitating the routing, sorting, and grouping of the cells, each cell including address and priority information, and comprising:

a) a plurality of switch element arrays for routing and sorting the cells based on the address and priority information to provide routed and sorted cells; and b) selective devices, arranged between each of the plurality of switch element arrays, for passing an appropriate one of the routed and sorted cells provided by a preceding one of the plurality of switch element arrays and cells received by the circuit, to a next of the plurality of switch element arrays based on the mode control signal, wherein, in each of the S columns, the routed and sorted cells provided by the plurality of switch element arrays of a circuit, are coupled with an input group of a lower adjacent circuit.

24. A multicast grouping network comprising R rows of S columns of circuits for facilitating the routing, sorting, and grouping of cells, each cell including address and priority information, each of the R times S circuits comprising:
   a) a first group of inputs for receiving a first group of input cells;
   b) a second group of inputs for receiving a second group of input cells;
   c) timing signal inputs for receiving a switch set timing signal, an address timing signal, and a priority timing signal;
   d) a mode input for receiving a mode signal;
   e) a clock signal input for receiving a clock signal;
   f) a group of outputs for providing a group of output cells;
   g) a first timing output for providing a first delayed address timing signal and a first delayed priority timing signal;
   h) a second timing output for providing a second delayed address timing signal;
   i) a plurality, N, of switch element arrays, each of the N switch element arrays having
      i) a first group of inputs for receiving a first group of M input cells,
      ii) a second group of inputs, coupled with M/N of the second group of inputs of the circuit, for receiving a second group of M/N input cells,
      iii) an address timing input for receiving an address timing signal,
      iv) a priority timing input for receiving a priority timing signal,
      v) a first group of outputs for providing a first group of M output cells,
      vi) a second group of outputs, coupled with M/N of the group of outputs of the circuit, for providing a second group of M/N output cells,
      vii) a first address output, coupled with the first timing output of the circuit, for providing a first delayed address timing signal,
      viii) a first priority output, coupled with the first timing output of the circuit, for providing a first delayed priority timing signal,
      ix) a second address output for providing a second delayed address timing signal, and
      x) a second priority output for providing a second delayed priority timing signal; and
   j) a plurality, N−1, of multiplexers arranged between adjacent ones of the N switch element arrays, each one of the N−1 multiplexers having
      i) a mode input, coupled with the mode input of the circuit, for receiving a multicast/unicast mode signal which is a portion of the mode signal received by the mode input of the circuit,
      ii) a control input for receiving a control signal corresponding to the particular multiplexer, wherein the control signal is derived from the mode signal provided to the mode input port of the circuit,
      iii) a first address timing input for receiving a first candidate address timing signal,
      iv) a second address timing input, coupled with the second address output of a preceding switch element array, for receiving a second candidate address timing signal,
      v) a first priority input, coupled with the timing signal inputs, for receiving a first candidate priority timing signal,
      vi) a second priority input, coupled with the second priority output of the preceding switch element array, for receiving a second candidate priority timing signal,
      vii) a first group of inputs, coupled with the first group of inputs of the circuit, for receiving a first group of candidate input cells,
      viii) a second group of inputs, coupled with the first group of outputs of the preceding switch element array, for receiving a second group of candidate input cells,
      ix) a mux output, coupled with the first address timing input of a next multiplexer, for providing a mux address timing signal,
      x) an address output, coupled with the address timing input of a next switch element array, for providing an address timing signal,
      xi) a priority output, coupled with the priority timing input of the next switch element array, for providing a priority timing signal, and
      xii) a group of outputs, coupled with the first group of inputs of the next switch element array, for providing a group of output cells, wherein, in each circuit, the group of outputs is coupled with the second group of inputs of a lower adjacent circuit.

25. The multicast grouping network of claim 24 wherein, in each of the S columns, the second group of inputs of a first upper circuit is coupled with a fixed voltage source for multicast operation.

* * * * *